United States Patent [19]

Shinkawa et al.

[11] 4,417,279
[45] Nov. 22, 1983

[54] FM TELEVISION SIGNAL RECEIVING CIRCUIT

[75] Inventors: Keiro Shinkawa, Yokohama; Shigeo Matsuura, Chigasaki; Chuichi Sodeyama; Masaki Noda, both of Yokohama; Masakazu Kondo, Fujisawa, all of Japan

[73] Assignee: Hitachi, Ltd., Tokyo, Japan

[21] Appl. No.: 348,016

[22] Filed: Feb. 11, 1982

[30] Foreign Application Priority Data

Feb. 16, 1981 [JP] Japan ................................. 56-20210

[51] Int. Cl.³ ............................................. H04N 5/50
[52] U.S. Cl. ................................ 358/195.1; 358/188; 455/208
[58] Field of Search .................. 358/188, 191.1, 195.1; 455/182, 184, 192, 205, 208, 255, 257, 265

[56] References Cited

U.S. PATENT DOCUMENTS 4,268,862  5/1981  Sasaki ............................... 358/195.1
4,281,348  7/1981  Shizuya .............................. 358/188

Primary Examiner—Richard Murray
Attorney, Agent, or Firm—Antonelli, Terry & Wands

[57] ABSTRACT

A receiving circuit for a television receiver for receiving an FM-modulated television signal is disclosed, in which the oscillation frequency of a local oscillator circuit is fine adjusted by a voltage of a sync signal of the FM-modulated television signal thereby to receive the television signal properly.

4 Claims, 10 Drawing Figures

FM TELEVISION SIGNAL RECEIVING CIRCUIT

The present invention relates to a receiving circuit of a television receiver for receiving an FM-modulated television signal.

A new television broadcasting system for transmitting television signals by use of an artificial satellite is contemplated. In this system, an FM-modulated television signal is transmitted on an electromagnetic wave of SHF band, especially, between 11 GHz and 12 GHz. A block diagram of a conventional receiving circuit for receiving the FM television signal is shown in FIG. 1. This receiving circuit receives the FM television signal of SHF band transmitted from an artificial satellite and converts it into a video signal. The FM television signal of approximately 12 GHz in frequency is received at an antenna 1 and applied to a first mixer 2 connected to the antenna 1. The first mixer 2 is connected to a first local oscillator 3 for producing a local oscillation signal which is supplied to the first mixer 2. The frequency of this local oscillation signal is confined to a predetermined value such as 10.74 GHz. The FM television signal is converted to a signal of UHF band of about 960 to 1390 MHz by the first mixer 2 and the converted signal is applied to an amplifier 4 connected with the first mixer 2. Generally, the antenna 1, the first mixer 2, the first local oscillator 3 and the amplifier 4 are installed outdoor. The first mixer 2, the first local oscillator 3 and the amplifier 4 make up a first heterodyne receiving circuit, by which the television signal is converted to a UHF signal. The UHF signal is transmitted indoor by way of a cable 5 and supplied to a second mixer 6. The second mixer 6 is connected with a second local oscillator 7 for generating a local oscillation signal to be applied to the second mixer 6. The frequency of this local oscillation signal is varied in accordance with a channel to be received, e.g. in accordance with a tuning voltage 7b applied to a terminal 7a. The television signal in UHF band is converted into a signal of VHF band of about 130 MHz at a second heterodyne receiving circuit including the second mixer 6 and the second local oscillator 7. The signal thus converted is applied to a limiter circuit 8 connected to the second mixer 6. At the limiter circuit 8, an amplitude of the VHF signal is limited to remove AM noises. An output signal of the limiter circuit 8 is applied to an FM detector circuit 9, where the signal is FM-detected to be converted into a video signal. This video signal is applied to a video processing circuit 10 connected to the FM detector circuit 9. The video processing circuit 10 includes an emphasis circuit and an energy dispersal signal remover circuit which removes an energy dispersal signal from the signal detected at the FM detector circuit 9 and regulates the frequency characterstic thereby to produce what is called a composite video signal. An output terminal 10a of the video processing circuit 10 is connected with a video amplifier circuit, a sync separation circuit, a deflection circuit and the like thereby to reproduce an image on a picture tube. In order to attain a superior signal-to-noise ratio (S/N), the limiter circuit 8 of this receiving circuit normally includes a band-pass filter of narrow band for passing a FM television signal of VHF band corresponding only to the channel to be received. In the case where the frequency of the FM television signal of VHF band corresponding to the channel to be received is within the pass band of the band-pass filter, the video signal produced from the video processing circuit 10 is high in quality, with result that a superior image is reproduced on the picture tube (not shown) of the television receiver. In the event that the frequency of the FM television signal of VHF band is out of the pass band of the band-pass filter, by contrast, the FM television signal is not properly applied to the FM detector circuit 9 thus making it impossible to reproduce a satisfactory image on the picture tube. The characteristic diagram of the band-pass filter is shown in FIG. 2. If the oscillation frequencies of the first and second local oscillators 3 and 7 deviate from the respective proper frequencies, the frequency of the FM television signal of VHF band is accordingly displaced so that the FM television signal can not pass the band-pass filter properly. Thus, the oscillation frequencies of the first and second local oscillators 3 and 7 of a conventional receiving circuit are required to be accurate. The first local oscillator 3 generally uses a resonator since it produces a signal of a predetermined constant frequency as mentioned above, so that the oscillaton frequency thereof undergoes a very little change. On the other hand, the oscillation frequency of the second local oscillator 7 is designed to be variable in accordance with the frequency of the television signal to be received, so that the oscillation frequency thereof undesirably often varies. As the second local oscillator 7, therefore, an oscillator is desired which oscillates with required frequencies for producing a proper FM television signal.

In the conventional ordinary television receiver, an AFT (automatic fine tuning) system is well known as means for controlling the frequency of the local oscillator of the tuner. This system is for controlling the frequency of the local oscillator of the tuner to attain a predetermined frequency of the television intermediate frequency signal thereby to produce a superior reproduction image on the picture tube. In a television receiver adapted to receive an FM-modulated television signal, however, the frequency of the television signal naturally undergoes frequent changes. For example, when the FM television signal is properly received, the spectrum of the FM television signal of VHF band is shown in FIG. 3, in which a pedestal level 11 has a mean frequency $f_0$, and a vertical sync signal 13 and a horizontal sync signal 14 have a mean frequency $f_1$, the mean frequencies and $f_1$ being fixed, whereas a mean frequency $f_2$ of a video signal 12 changes between a mean frequency $f_3$ at a peak 12p of the video signal 12 and a mean frequency $f_0$ of a pedestal level in accodance with the change of the video signal 12. The mean frequency $f_3$ of the peak 12p of the video signal 12 also undergoes a variation. In other words, the frequency spectrum of the television signal varies between the frequency $f_1$ and the frequency $f_3$, so that it is impossible to control the oscillation frequency of the second local oscillator 7 properly by the FM television signal of VHF band alone.

Accordingly, it is an object of the present invention to provide a receiving circuit for the FM television signal which is capable of reproducing a superior video signal, or more in particular to provide a receiving circuit for the FM television signal in which an output frequency of an oscillator for producing a local oscillation signal used for converting an FM television signal of UHF band into an FM television signal of VHF band is always regulated to a required frequency.

As explained above, the frequency spectrum of the FM television signal is different from the frequency spectrum of the conventional television signal and is such that the mean frequency of a pedestal level of the television signal is fixed at $f_0$ and the mean frequency of vertical and horizontal sync signals is fixed at $f_1$, so that the mean value of the spectrum of the FM television signal is always $f_1$ during the period of the vertical and horizonal sync signals. Therefore, if the frequency of the FM signal during the vertical or horizontal sync signal is detected and if the detected frequency is examined whether or not it coincides with the frequency $f_1$, it will be possible to determine whether the FM television signal is received properly or not. If is is determined that the FM television signal is not properly received, the oscillation frequency of the second local oscillator may be controlled such that the frequency of the FM television signal coincides with the frequency $f_1$ during the period of the vertical sync signal or the horizontal sync signal thereby to receive the proper FM television signal. In the receiving circuit according to the present invention, an output signal of the FM detector circuit is used, in such a manner that the vertical sync signal and/or the horizontal sync signal is selectively detected by the FM detector, and the selectively detected voltage thereof is used to detect the frequency $f_1$ of the FM television signal indirectly. At the same time, the oscillation frequency of the second local oscillator circuit is controlled by the selectively detected output signal of the FM detector circuit.

The present invention will be apparent from the following detailed description taken in conjunction with the accompanying drawings in which.

Figure 1:
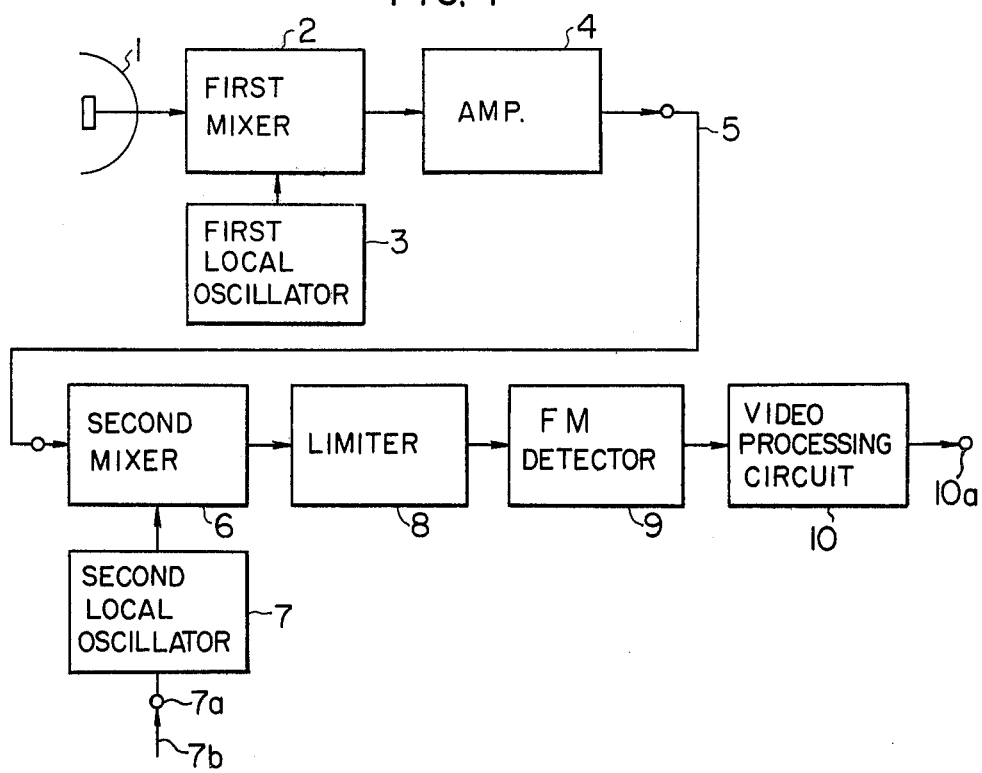
FIG. 1 is a block diagram showing a conventional receiving circuit for receiving an FM-modulated television signal.
Figure 2:
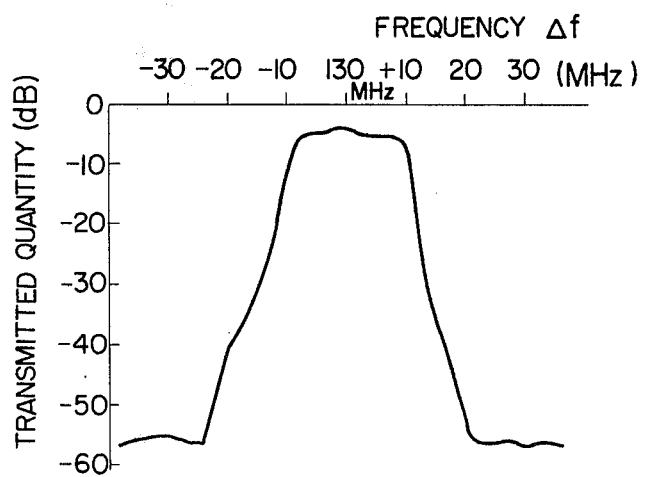
FIG. 2 shows a frequency characteristic of a band-pass filter with a narrow pass band.
Figure 3:
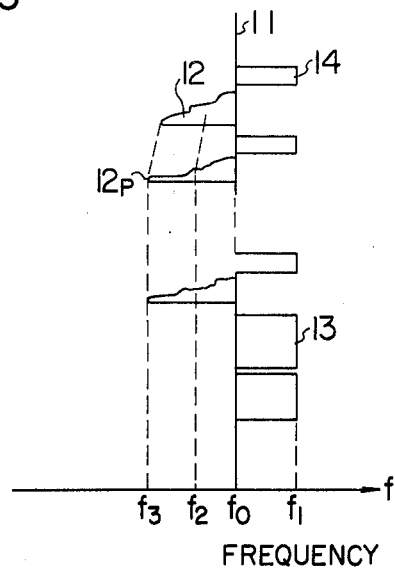
FIG. 3 is a diagram showing a frequency characteristic for explaining the frequency spectrum of an FM television signal.
Figure 4:
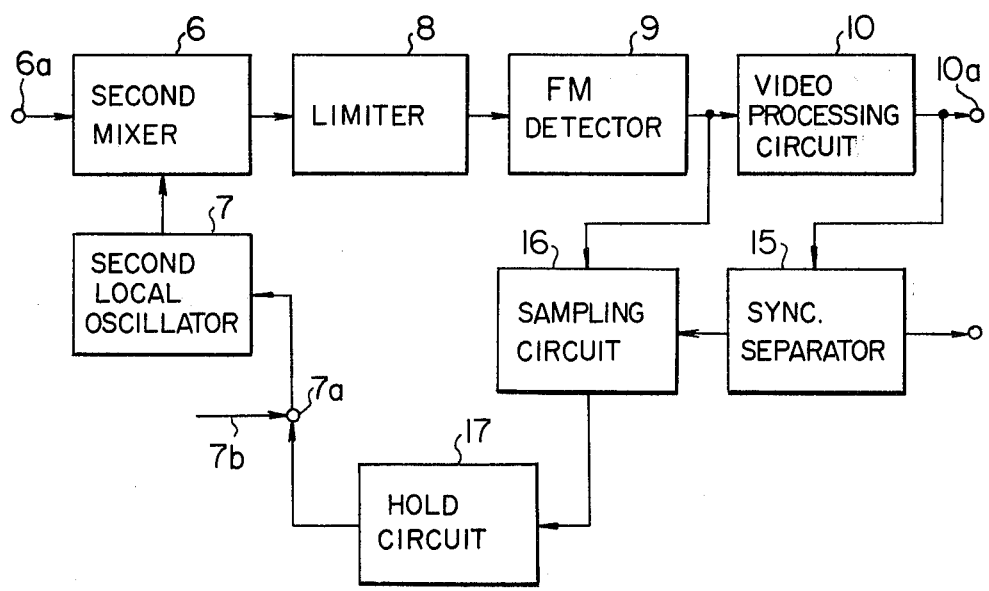
FIG. 4 is a block diagram showing an embodiment of a receiving circuit according to the present invention.
Figure 5:
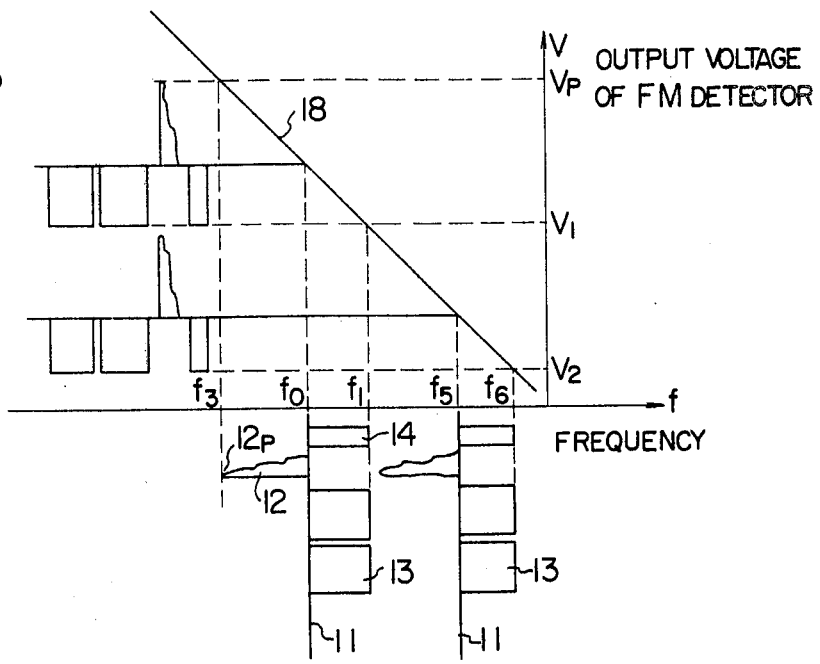
FIG. 5 is a characteristic diagram for explaining the detection characteristic of an FM detector circuit.

A receiving circuit for the FM television signal according to the present invention will be described with reference to FIGS. 4, 5 and 6. First, explanation will be made of first embodiment of the receiving circuit according to the present invention with reference to FIG. 4. In FIG. 4, a second mixer 6, a second local oscillator 7, a limiter circuit 8, an FM detector circuit 9 and a video processing circuit 10 are identical in the function respectively to those shown in FIG. 1. The second mixer 6 is connected as shown in FIG. 1, by way of a cable 5 to an amplifier 4 from a terminal 6$a$, and an output signal of the video processing circuit 10 is produced through a terminal 10$a$. In a configuration characteristic of the receiving circuit according to the present invention, the FM detector circuit 9 is connected to a sampling circuit 16, which in turn is connected to a hold circuit 17, the output signal of which is supplied to the second local oscillator circuit 7. At the same time, the sampling circuit 16 is supplied with a sync signal from a sync separation circuit 15 which is connected to the video amplifier circuit 10. In the sampling circuit 16, a signal voltage applied from the FM detector circuit 9 is picked up only for the sync signal period in response to the sync signal used as a sample signal. The sync signal used as a sample signal may be a horizontal sync signal 14 and/or a vertical sync signal 13. FIG. 5 shows a detection slope of the FM detector circuit 9. In the case where the FM television signal is received properly, the mean frequency of the pedestal level is located at a frequency $f_0$, the mean frequency of the sync signals 13 and 14 at a frequency $f_1$, and the means frequency of a peak 12$p$ of the video signal 12 at a frequency $f_3$, and the mean voltage of the output signal of the FM detector circuit 9 changes from a voltage $V_1$ to a voltage $V_P$. The output voltage of the FM detector circuit in a range of $V_1$ to $V_P$ is supplied to the sampling circuit 16, at which only the signal voltage $V_1$ is picked up. The signal voltage $V_1$ obtained at the sampling circuit 16 is applied to the hold circuit 17 and held therein for a predetermined period, and thereafter applied to the second local oscillator 7. Assume, on the other hand, that the FM television signal is not properly received such that the mean frequency of the pedestal level is displaced from the frequency $f_0$ to the frequency $f_5$ and that the mean frequency of the sync signals 13 and 14 is $f_6$, the signal voltage detected at the sampling circuit 16 becomes $V_2$. This detected voltage $V_2$ is applied from the sampling circuit 16 to the second oscillator circuit 7 through the hold circuit 17. If the voltage applied from the hold circuit 17 to the local oscillator circuit 7 is $V_1$, the oscillation frequency of the local oscillator circuit 7 does not change, so that the FM television signal continues to be received properly. When the voltage applied from the hold circuit 17 to the local oscillator circuit 7 takes a value such as $V_2$ other than $V_1$, the oscillation frequency of the local oscillator circuit 7 changes. With the change of the oscillation frequency of the local oscillator circuit 7, the frequencies of the pedestal level 11 of the television signal of VHF band and the sync signal 13 also change to $f_5$ and $f_6$ respectively. According to the present invention, in this case, the oscillation frequency of the local oscillator circuit 7 is regulated automatically such that the frequencies of the pedestal level 11 and the sync signal 13 becomes $f_0$ and $f_1$ respectively. Namely, the frequency of the pedestal level 11 of the television signal changes from $f_5$ to $f_0$, and the frequency of the sync signal 13 changes from $f_6$ to $f_1$, thus enabling the television signal to be properly received.

Figure 6:
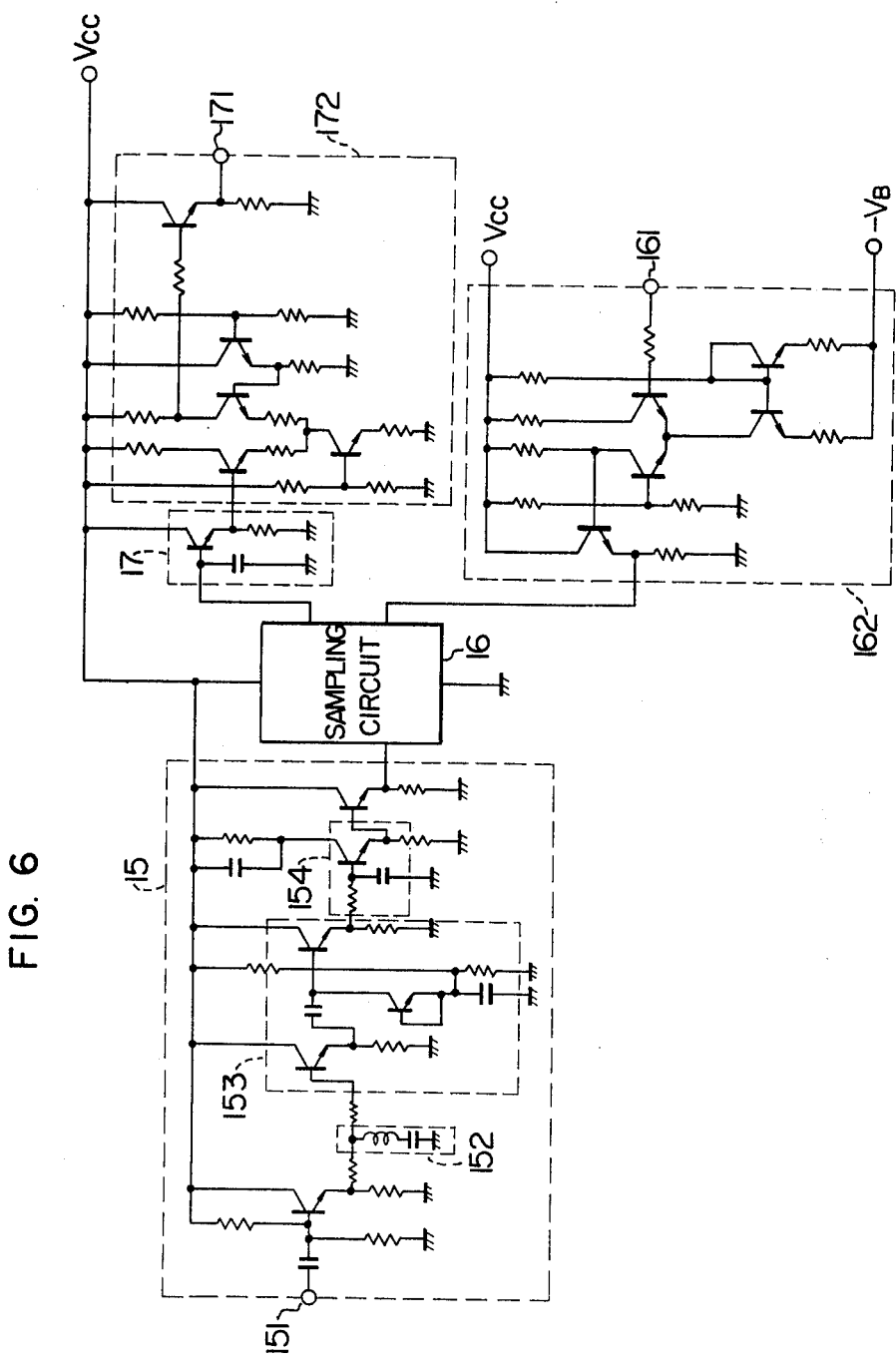
FIG. 6 is a diagram showing a sync separation circuit, a sampling circuit and a hold circuit.

A circuit diagram of the sync separation circuit 15, the sampling circuit 16 and the hold circuit 17 and so on is shown in FIG. 6. An output signal of the FM detector circuit 9 is applied to a terminal 161 and then applied to the sampling circuit 16 through an amplifier circuit 162. An output signal of the video amplifier circuit 10 is applied through a terminal 151 to the sync separation circuit 15. The burst signal in the composite video signal applied to the terminal 151 is removed by a burst trap 152. Further, the energy dispersal signal is removed from the output of the burst trap by a clamp circuit 153 thereby fixing the peak value of the sync signal at a predetermined voltage, and thereafter the sync signal is separated by a circuit 154. The sync signal is applied to the sampling circuit 16. The sampling circuit 16 is comprised of, e.g., a gate IC of CMOS such as CD4066BE of RCA Ltd. The output signal of the sampling circuit 16 is applied to the hold circuit 17 for conversion to DC voltage, and applied to the local oscillator circuit 7 through an amplifier circuit 172 and an terminal 171.

Figure 7:
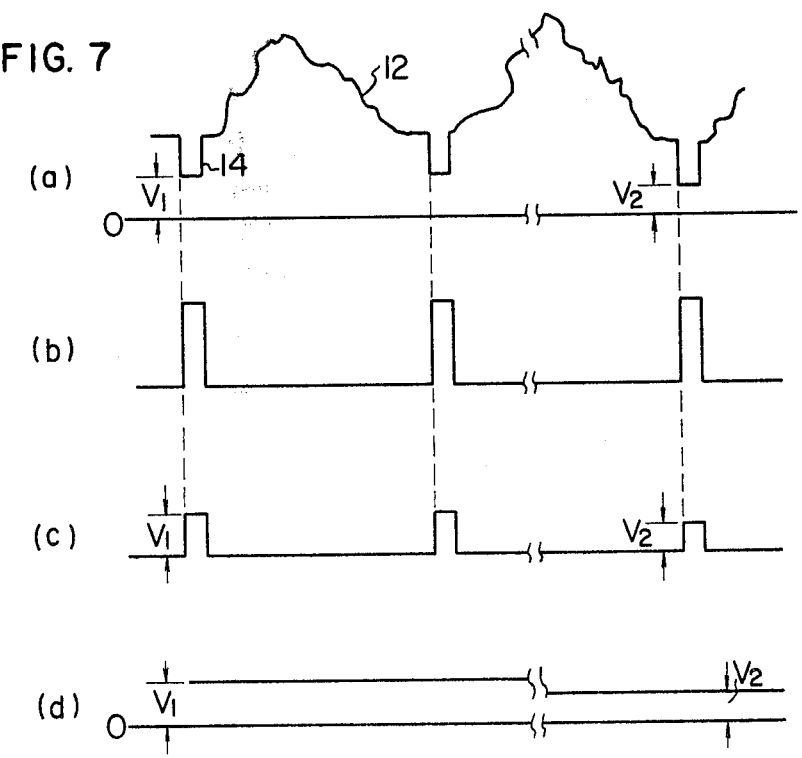
FIGS. 7 $a$–$d$ are diagrams showing voltage waveforms of signals in the detector circuit, sync separation circuit, sampling circuit and hold circuit.

Signal waveforms produced at the respective blocks in FIG. 4 are shown in FIG. 7. (a) of FIG. 7 shows a voltage waveform of the composite video signal applied from the video amplifier circuit 10 through the amplifier 162 to the sampling circuit 16, (b) of FIG. 7 shows an output voltage waveform produced from the sync separation circuit 15, (c) of FIG. 7 shows a waveform of a signal obtained at the sampling circuit 16, and (d) of FIG. 7 shows a voltage waveform of a signal obtained at the hold circuit 17 on the basis of the signal obtained at the sampling circuit 16. As obvious from (a) to (d) of FIG. 7, voltages corresponding to the peak voltage values $V_1$ and $V_2$ of the sync signal of the video signal are obtained as output signals of the hold circuit 17. Thus, as mentioned above, the oscillation frequency of the local oscillator circuit 7 is capable of being controlled by the output voltages $V_1$ and $V_2$.

In the aforementioned embodiment, the sampling circuit 16 and the hold circuit 17 are provided separately. As an alternative to this construction, the receiving circuit according to the present invention may comprise a sample and hold circuit in place of the sampling circuit 16 and the hold circuit 17.

The receiving circuit according to the present invention attains a remarkably great effect when using a band-pass filter with a narrow pass band as the limiter circuit 8. According to the present invention, however, the oscillation frequency of the local oscillator circuit is always controlled to a desirable frequency, and therefore, the present invention is applicable to a receiving circuit in which the band-pass filter with a narrow pass band is not utilized. Also, the limiter 8 may be used only when required and is not always necessary.

The energy dispersal signal, which is not shown in FIGS. 5 and 7 and is obtained by superimposing the video signal on the output of the FM detector circuit 9, may be removed by being integrated at the hold circuit 17.

It will be understood from the foregoing description that, according to the present invention, a vertical or a horizontal sync signal is picked up from the television signal of a video band generated at the video signal processing circuit, a DC voltage is picked up from the detection voltage produced from the FM detector circuit during a sync pulse period, and the oscillator frequency of the local oscillator circuit is controlled to attain the proper value of the DC voltage. Thus, the use of this receiving circuit always enables the reproduction of a tuned stable image on the picture tube with a simple construction on one hand, and eliminates the need of an extremely stable oscillator as the local oscillator circuit thereby to facilitate the circuit design on the other hand.

We claim:

1. A receiving circuit for a television receiver for receiving an FM-modulated television signal, comprising:
    a mixer circuit, supplied with an FM-modulated television signal of a first frequency band and a local oscillation signal from a local oscillator circuit, for converting said FM-modulated television signal of the first frequency band into a television signal of a second frequency band in accordance with said local oscillation signal;
    the local oscillator circuit generating the local oscillation signal and applying it to said mixer circuit, a frequency of the local oscillation signal being varied in accordance with a tuning voltage supplied from an external source which represents a channel of the television signal to be received;
    an FM detector circuit for FM-detecting the FM-modulated television signal of the second frequency band from said mixer circuit and producing a television composite video signal;
    a video amplifier circuit for amplifying the composite video signal from said FM detector circuit;
    a sync separation circuit for separating a sync signal from the composite video signal applied thereto from said video amplifier circuit and outputting only said sync signal;
    a sampling circuit, supplied with the composite video signal from said FM detector circuit and the sync signal from said sync separation circuit, for picking up the sync signal voltage of said composite video signal in accordance with said sync signal from said sync separation circuit, said sampling circuit producing an output voltage corresponding to the frequency spectrum of the sync signal of the television signal of the second frequency band, and applying it to a hold circuit; and
    the hold circuit for holding the output voltage signal from said sampling circuit for a predetermined period, producing a DC voltage corresponding to the output voltage signal from said sampling circuit, and applying said DC voltage to said local oscillator circuit, said DC voltage being superimposed on the tuning voltage applied to said local oscillator circuit and controlling the oscillation frequency of said local oscillator circuit such that the frequency spectrum of the sync signal of the television signal of the second frequency band takes a predetermined value.

2. A receiving circuit for a television receiver for receiving an FM-modulated television signal, comprising:
    a first mixer circuit, supplied with an FM-modulated television signal of SHF band from an antenna and a first local oscillation signal from a first local oscillator circuit, for converting said FM-modulated television signal of SHF band into an FM-modulated television signal of UHF band in accordance with said first local oscillation signal;
    the first local oscillator circuit for producing the first local oscillation signal of a predetermined frequency and applying said first local oscillation signal to said first mixer circuit;
    an amplifier for power-amplifying the FM-modulated television signal of UHF band supplied thereto from said first mixer circuit and applying the power-amplified FM-modulated television signal to a second mixer circuit;
    the second mixer circuit, supplied with the FM-modulated television signal from said amplifier and a second local oscillation signal from a second local oscillator circuit, for converting said FM-modulated television signal of UHF band into an FM-modulated television signal of VHF band in accordance with said second local oscillation signal;
    the second local oscillator circuit for generating the second local oscillation signal and applying it to said second mixer circuit, a frequency of the second oscillation signal being varied in accordance with a tuning voltage applied from an external source which represents a channel of the television signal to be received;

an FM detector circuit for FM-detecting the FM-modulated television signal of VHF band supplied thereto from said second mixer circuit and producing a television composite video signal;

a video amplifier circuit for amplifying the composite video signal applied thereto from said FM detector circuit;

a sync separation circuit for separating a sync signal from the composite video signal applied thereto from said video amplifier circuit and outputting only said sync signal;

a sampling circuit, supplied with the composite video signal from said FM detector circuit and the sync signal from said sync separation circuit, for picking up the sync signal voltage of said composite video signal in accordance with said sync signal from said sync separation circuit, said sampling circuit producing an output voltage corresponding to the frequency spectrum of the sync signal of the television signal of VHF band and applying it to a hold circuit; and the hold circuit for holding the output voltage signal from said sampling circuit for a predetermined period, generating a DC voltage corresponding to the output voltage signal from said sampling circuit, and applying said DC voltage to the second local oscillator circuit, said DC voltage being superimposed on the tuning voltage applied to said second local oscillator circuit and controlling the oscillation frequency of said second local oscillator circuit such that the frequency spectrum of the sync signal of the television signal of VHF band takes a predetermined value.

3. A receiving circuit for a television receiver for receiving an FM-modulated television signal, conprising:

a first mixer circuit, supplied with an FM-modulated television signal of SHF band from an antenna and a first local oscillation signal from a first local oscillator circuit, for converting said FM-modulated television signal of SHF band into an FM-modulated television signal of UHF band in accordance with said first local oscillation signal;

the first local oscillator circuit for producing the first local oscillation signal of a predetermined frequency and applying said first local oscillation signal to said first mixer circuit;

an amplifier for power-amplifying the FM-modulated television signal of UHF band supplied thereto from said first mixer circuit and applying the power-amplified FM-modulated television signal to a second mixer circuit;

the second mixer circuit, supplied with the FM-modulated television signal from said amplifier and a second local oscillation signal from a second local oscillator circuit, for converting said FM-modulated television signal of UHF band into an FM-modulated television signal of VHF band in accordance with said second local oscillation signal;

the second local oscillator circuit for generating the second local oscillation signal and applying it to said second mixer circuit, a frequency of the second oscillation signal being varied in accordance with a tuning voltage applied from an external source which represents a channel of the television signal to be received;

a limiter circuit for removing a signal with an amplitude larger than a predetermined level from the FM-modulated television signal of VHF band applied thereto from said second mixer circuit in order to remove AM noises therefrom, and then applying the FM-modulated television signal of VHF band to an FM detector circuit;

the FM detector circuit for FM detecting the television signal of VHF band applied from said limiter circuit, thus producing a television composite video signal;

a video amplifier circuit for amplifying the composite video signal applied thereto from said FM detector circuit;

a sync separation circuit for separating only a sync signal from the composite video signal applied thereto from said video amplifier circuit and outputting only said sync signal;

a sampling circuit, supplied with the composite video signal from said FM detector circuit and the sync signal from said sync separation circuit, for picking up the sync signal voltage of said composite video signal in accordance with said sync signal from said sync separation circuit, said sampling circuit producing an output voltage corresponding to the frequency spectrum of the sync signal of the television signal of VHF band and applying it to a hold circuit; and the hold circuit for holding the output voltage signal from said sampling circuit for a predetermined period, producing a DC voltage corresponding to the output voltage signal from said sampling circuit, and applying said DC voltage to said second local oscillator circuit, said DC voltage being superimposed on the tuning voltage applied to said second local oscillator circuit and controlling the oscillation frequency of said second local oscillator circuit such that the frequency spectrum of the sync signal of the television signal of VHF band takes a predetermined value.

4. A receiving circuit according to claim 3, wherein said limiter circuit includes a band-pass filter with a narrow pass band.

* * * * *